2,992,201
EXTRUSION COMPOSITION CONSISTING OF POLYETHYLENE AND LIQUID DIMETHYL POLYSILOXANES

Henry F. Gober, Jr., Kingsport, Tenn., assignor to Eastman Kodak Company, Rochester, N.Y., a corporation of New Jersey
No Drawing. Filed Apr. 9, 1958, Ser. No. 727,275
7 Claims. (Cl. 260—29.1)

This invention relates to extrusion molding compositions and more particularly to such compositions consisting of polyethylene and a non-blocking agent from which pellets, granules, sheeting and film can be made which have such desirable non-blocking or non-sticking characteristics.

For all practical purposes, the lowest molecular weight polyethylene which can be employed for film and sheeting extrusion purposes is one having a molecular weight of approximately 20,000. Polyethylene having molecular weights in the range of approximately 20,000 to 40,000 may be extruded satisfactorily into sheeting or films. Such polyethylene tends to be somewhat adhesive and when in sheet or film form and stacked together, blocking of the stack may occur. Also, when this polyethylene is extruded into continuous lengths of tubing which is flattened and wound into coils for storage and packaging purposes, the superimposed coils may stick together. This creates handling and processing problems when the flattened tubes are to be fabricated into various products.

An object, therefore, of the present invention is to provide an improved polyethylene composition which is substantially non-sticking.

Another object is to provide an improved non-blocking polyethylene extrusion molding composition from polyethylene having a molecular weight within the range of 20,000 to 40,000.

Still another object is to provide a novel polyethylene extrusion composition containing as an anti-sticking agent one or more polymeric silicones.

Yet another object is to provide an extruded polyethylene sheet or film which has non-blocking characteristics.

Other objects will appear hereinafter.

In accordance with the present invention, an anti-sticking agent consisting of a liquid polymeric silicone oil is suitably incorporated into polyethylene having a molecular weight within the range of 20,000 to 40,000. Pellets, granules, extruded sheeting and film which have non-sticking characteristics may be made therefrom by conventional methods.

The liquid polymeric silicone oils suitable for the practice of this invention consist essentially of those compounds having a unit structure

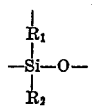

in which $R_1$ and $R_2$ are alkyl groups, e.g. methyl groups.

A suitable silicone oil is dimethyl polysiloxane sold under the trademark Linde X–522.

The polyethylene may comprise that in a melt index range of 1.4 to 3 and in a molecular weight range of 20,000 to 40,000. The amount of polymeric silicone oil may be within the range of 0.025 to 0.50 part per 100 parts by weight of polyethylene depending on the amount of slip desired.

This invention is further illustrated in the following examples.

Example 1

Dimethyl polysiloxane having a viscosity of approximately 95 cps. at 25° C. was incorporated into polyethylene having a molecular weight of 20,000 in a 2-roll rubber mill at a temperature of 150° C. and rolled for 15–20 minutes. The concentration of the dimethyl polysiloxane was 0.25 part by weight of polyethylene. The batch was granulated on a 2½ inch extruder which was equipped to form lay-flat tubing. The temperatures on the extruder were: back 310° F., middle 370° F., front 370° F., gate 350° F., neck 350° F., and die 350° F. The lay-flat tubing was blown into a thickness of 0.0015 inch and exhibited excellent slippage and no sticking. The same polyethylene without the dimethyl polysiloxane addition when extruded under the same conditions produced sticking to such an extent that it was very difficult to open the lay-flat tubing.

Example 2

A concentration of 0.20 part by weight of the same dimethyl polysiloxane was added to polyethylene having a molecular weight of 34,000 and mixed together under the same conditions as reported in Example 1. A lay-flat tubing was produced which did not exhibit any sticking.

Example 3

A concentration of 0.50 part by weight of dimethyl polysiloxane was added to polyethylene having a molecular weight of 30,000 and mixed together under the same conditions as described in Example 1. This produced a lay-flat tubing with no sticking tendency.

Example 4

Polyethylene of a molecular weight of 40,000 containing a concentration of 0.025 part by weight of dimethyl polysiloxane was mixed together in the same manner as reported in Example 1. The lay-flat tubing had some slippage and exhibited no tendency to stick.

Example 5

Polyethylene of a molecular weight of 40,000 containing a concentration of 0.50 part by weight of dimethyl polysiloxane was thoroughly mixed together. Lay-flat tubing extruded under the conditions described in Example 1 exhibited no tendency to stick.

Example 6

The lay-flat tubing made in accordance with Examples 1 to 4 was cut longitudinally and flattened and then cut in small sheets of equal size. One hundred of these sheets were stacked up and left for several days at room temperatures (approximately 72° F.). On examination, none of the sheets were found to be stuck to adjacent sheets.

Example 7

Pellets respectively of the compositions in Examples 1 to 4 were made by employing the pelleting process disclosed in Hull and Schrader application Serial No. 567,199, filed February 23, 1956 now Patent 2,918,701 of December 29, 1959. The pellets were free flowing and did not tend to adhere when packaged in fiber drums.

This application is a continuation-in-part of my co-pending application Serial No. 561,674, filed January 26, 1956, now abandoned, and entitled "Non-Sticking Polyethylene Compositions and Articles Made Therefrom."

The invention has been described in detail with particular reference to preferred embodiments thereof, but it will be understood that variations and modifications can be effected within the spirit and scope of the invention as described hereinabove and as defined in the appended claims.

I claim:

1. A polyethylene extrusion molding composition consisting of 100 parts by weight of solid polyethylene having a molecular weight within the range of 20,000 to 40,000 and 0.025 to 0.50 part by weight of liquid dimethyl polysiloxanes.

2. A polyethylene extrusion molding composition consisting of 100 parts by weight of solid polyethylene having a molecular weight within the range of 20,000 to 40,000 and 0.025 part by weight of liquid dimethyl polysiloxanes.

3. A polyethylene extrusion molding composition consisting of 100 parts by weight of solid polyethylene having a molecular weight within the range of 20,000 to 40,000 and 0.50 part by weight of liquid dimethyl polysiloxanes.

4. A polyethylene extrusion composition consisting of 100 parts by weight of polyethylene having a molecular weight of 20,000 and 0.025 part by weight of liquid dimethyl polysiloxanes.

5. A polytheylene extrusion composition consisting of 100 parts by weight of polyethylene having a molecular weight of 34,000 and 0.20 part by weight of liquid dimethyl polysiloxanes.

6. A polyethylene extrusion composition consisting of 100 parts by weight of polyethylene having a molecular weight of 30,000 and 0.50 part by weight of liquid dimethyl polysiloxanes.

7. Pellets for use in extrusion molding processes consisting of 100 parts by weight of solid polyethylene having a molecular weight within the range of 20,000 to 40,000 and 0.025 to 0.50 part by weight of liquid dimethyl polysiloxanes.

References Cited in the file of this patent

UNITED STATES PATENTS

| | | |
|---|---|---|
| 2,655,489 | Lawson | Oct. 13, 1953 |
| 2,888,419 | Safford | May 26, 1959 |